United States Patent [19]
Fasen et al.

[11] Patent Number: 5,305,132
[45] Date of Patent: * Apr. 19, 1994

[54] OPTICAL WAVELENGTH COMMUNICATION SYSTEM AND METHOD OF USING SAME

[75] Inventors: Kenneth R. Fasen, San Diego; Michael A. Menadier, Vista; Michael A. Williams, San Diego, all of Calif.

[73] Assignee: H. M. Electronics, Inc., San Diego, Calif.

[*] Notice: The portion of the term of this patent subsequent to Nov. 21, 2006 has been disclaimed.

[21] Appl. No.: 896,334

[22] Filed: Jun. 10, 1992

Related U.S. Application Data

[63] Continuation of Ser. No. 692,590, Apr. 29, 1991, abandoned, which is a continuation of Ser. No. 326,225, Mar. 20, 1989, abandoned, which is a continuation-in-part of Ser. No. 132,345, Dec. 14, 1987, Pat. No. 4,882,770.

[51] Int. Cl.$^5$ .......................................... H04B 10/24
[52] U.S. Cl. ................................. 359/113; 359/125; 359/152; 359/172
[58] Field of Search ............................... 359/113–114, 359/125, 143, 152, 172, 174

[56] References Cited

U.S. PATENT DOCUMENTS 4,882,770 11/1989 Miyahira et al. .................... 359/113

FOREIGN PATENT DOCUMENTS 0165058 12/1985 European Pat. Off. ............ 359/114
0236180 9/1987 European Pat. Off. ............ 359/143

*Primary Examiner*—Richard E. Chilcot, Jr.
*Assistant Examiner*—K. Negash
*Attorney, Agent, or Firm*—Bernard L. Kleinke; Jerry R. Potts

[57] ABSTRACT

A light frequency communications system and method of using the system is disclosed. The system includes a base station and a plurality of remote units wherein the base station and all the remote units communicate in a full duplex mode utilizing a single light wave carrier. Multiplexing between the units is accomplished by modulating an audio signal on at least one subcarrier frequency.

28 Claims, 8 Drawing Sheets

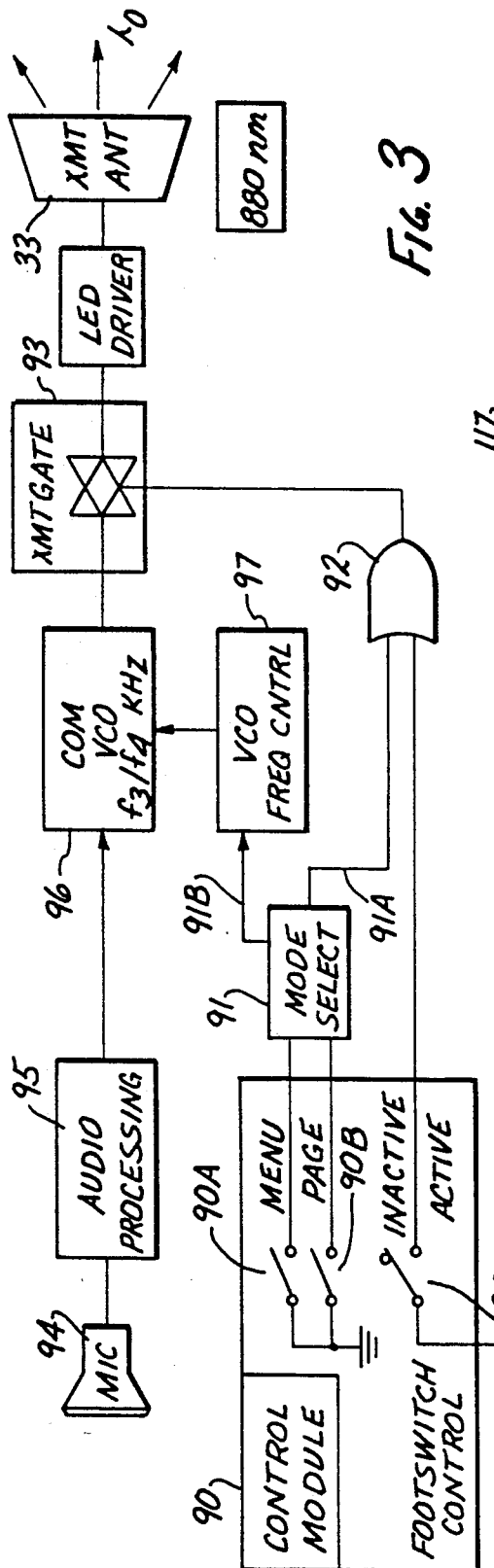
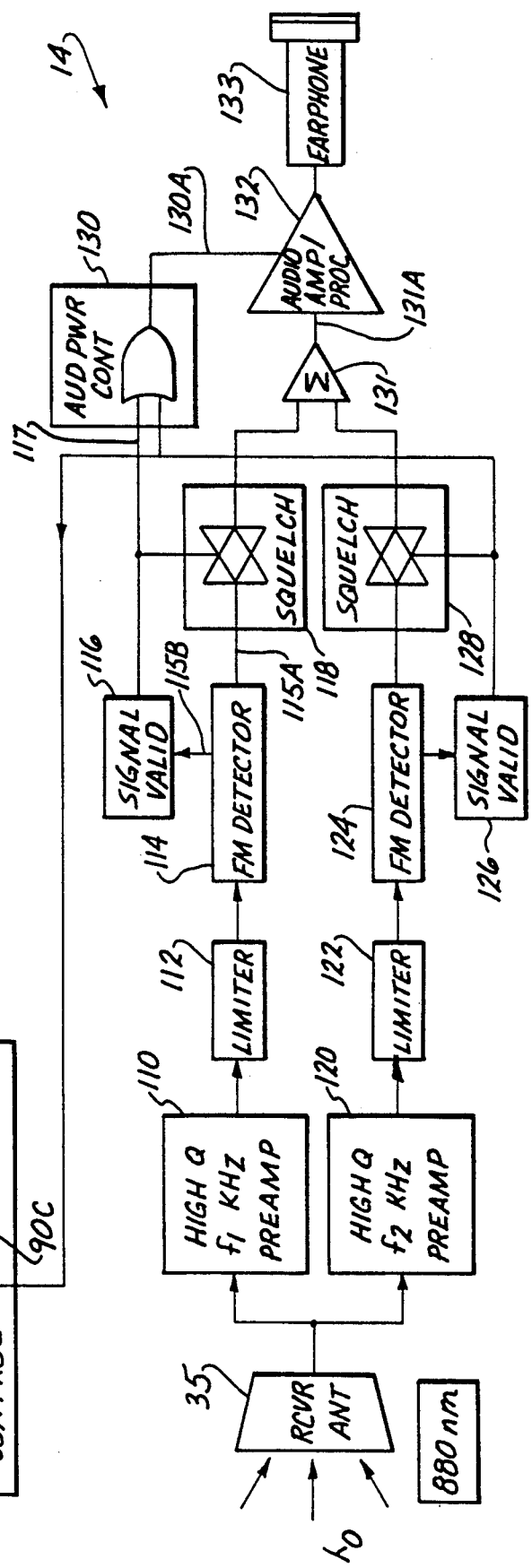
Fig. 3

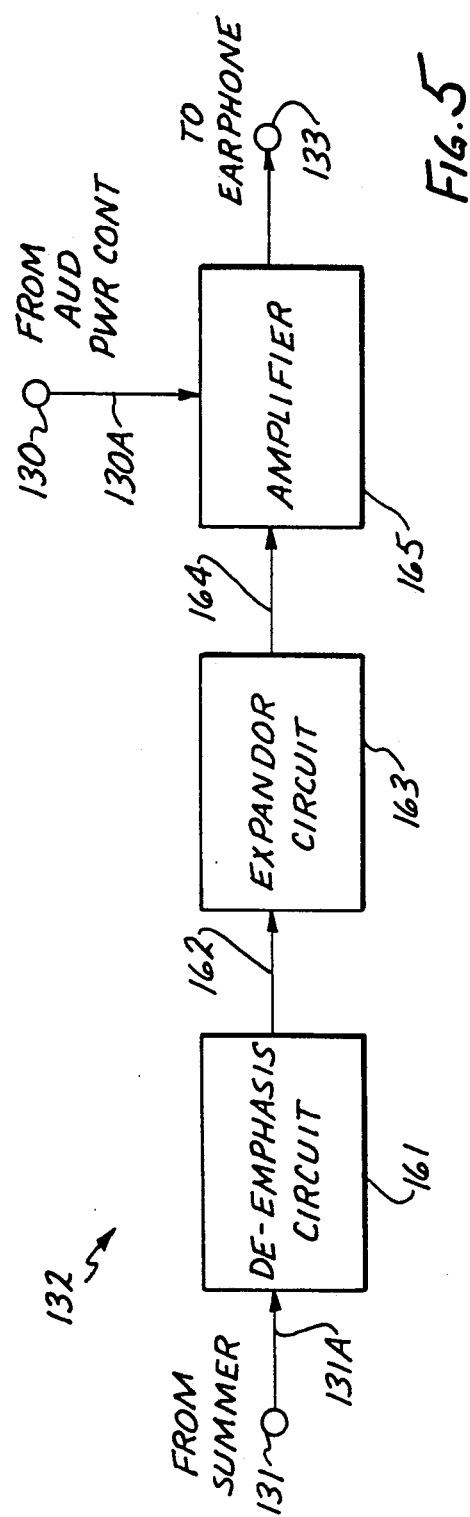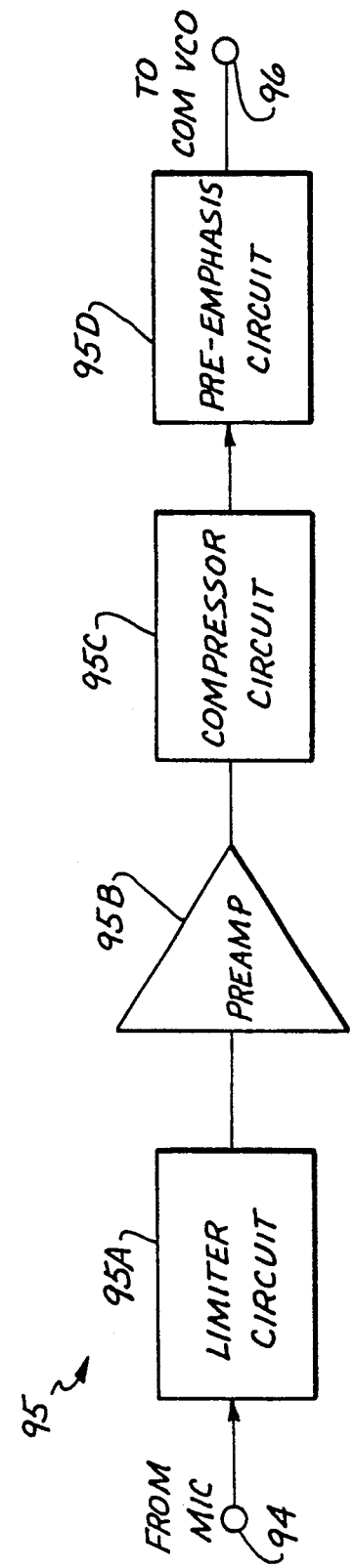

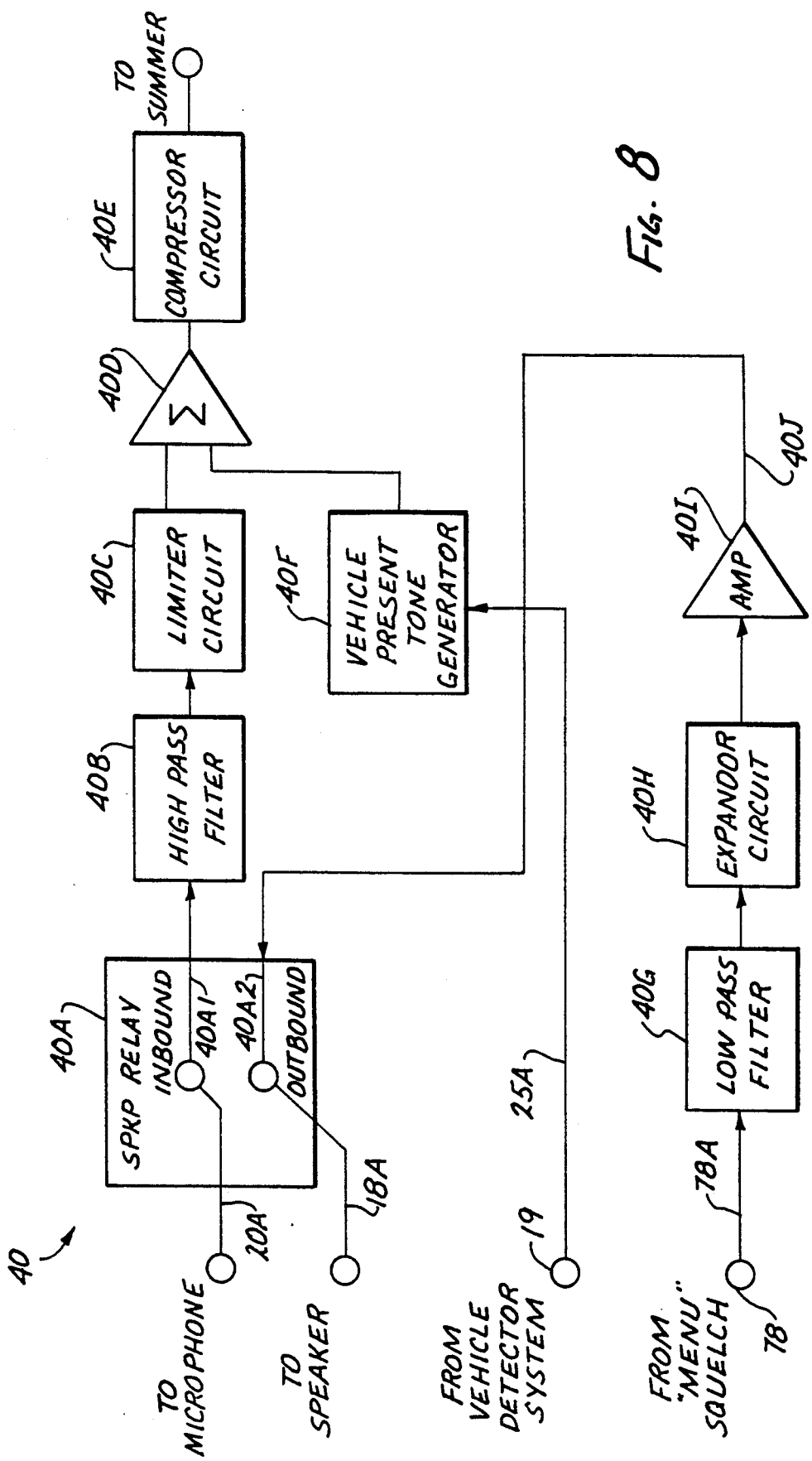

OPTICAL WAVELENGTH COMMUNICATION SYSTEM AND METHOD OF USING SAME

CROSS REFERENCE TO RELATED APPLICATION

This application is a continuation-in-part patent application of application of copending U.S. patent application Ser. No. 07/692,590 filed Apr. 29, 1991 entitled "OPTICAL WAVELENGTH COMMUNICATION SYSTEM AND METHOD OF USING SAME," which is now abandoned, which is a continuation of U.S. patent application Ser. No. 07/326,225 entitled "OPTICAL WAVELENGTH COMMUNICATION SYSTEM AND METHOD OF USING SAME," filed Mar. 20, 1989 which is now abandoned, and which is a continuation-in-part of U.S. patent application Ser. No. 07/132,345 filed Dec. 14, 1987, now U.S. Pat. No. 4,882,790 issued Nov. 21, 1989 entitled "WIRELESS OPTICAL COMMUNICATION SYSTEM."

TECHNICAL FIELD

The present invention relates in general to an optical wavelength communication system and method of using it, and the invention more particularly relates to such a system, which operates preferably on an infrared wavelength carrier.

DISCLOSURE OF INVENTION AND BACKGROUND ART

Optical wavelength communication systems are highly desirable for use in many different applications. For example, such systems can be used to replace radio frequency systems, such as those used in fast food restaurants, since the optical wavelength systems do not require special government licenses and are more tolerant to noise interference.

For example, a short range, optical wavelength carrier communication system is disclosed in co-pending patent application Ser. No. 07/176,939, filed Apr. 4, 1988, and assigned to the same assignee as the subject application. In the co-pending application, the optical wavelength communication system enables full duplex communication between two or more transceivers. In this regard, both transceivers can communicate simultaneously with one another over a single optical wavelength carrier signal. A single optical wavelength carrier is used, and the carrier is shared on a time division multiplex basis to avoid the problems of sensitivity, should an outgoing signal interfere with an incoming signal. While such a wavelength carrier system may be highly useful for many applications, it would be highly desirable to have a wavelength communication system, which did not employ a time division multiplex arrangement. In this regard, it would be highly desirable to have a full duplex optical wavelength carrier communication system, which would not require complex time division multiplex synchronization circuits.

Therefore, it would be highly desirable to have a full duplex, optical wavelength carrier system, which operates either on a single or multiple wavelength carrier, without the need for time division multiplex synchronizing circuits. Such a system should be highly efficient and as sensitive as the time division multiplex system. In this regard, such a system should be arranged to prevent the outgoing signal from interfering with the incoming signal, thereby resulting in unwanted and undesirable insensitivity. Also, such a system should be relatively inexpensive to manufacture.

BRIEF DESCRIPTION OF DRAWINGS

The above mentioned and other objects and features of this invention and the manner of attaining them will become apparent, and the invention itself will be best understood by reference to the following description of embodiments of the invention in conjunction with the accompanying drawings, wherein:

FIG. 3 is a functional block diagram of a typical remote station as shown in FIG. 1;

FIG. 5 is a functional block diagram of the audio amplifier processing circuit of the remote station of FIG. 3;

FIG. 6 is a functional block diagram of the audio processing circuit of the remote station of FIG. 3;

FIG. 8 is a functional block diagram of the audio processing speaker relay circuit of the base station of FIG. 2;

BEST MODE FOR CARRYING OUT THE INVENTION

Figure 1:
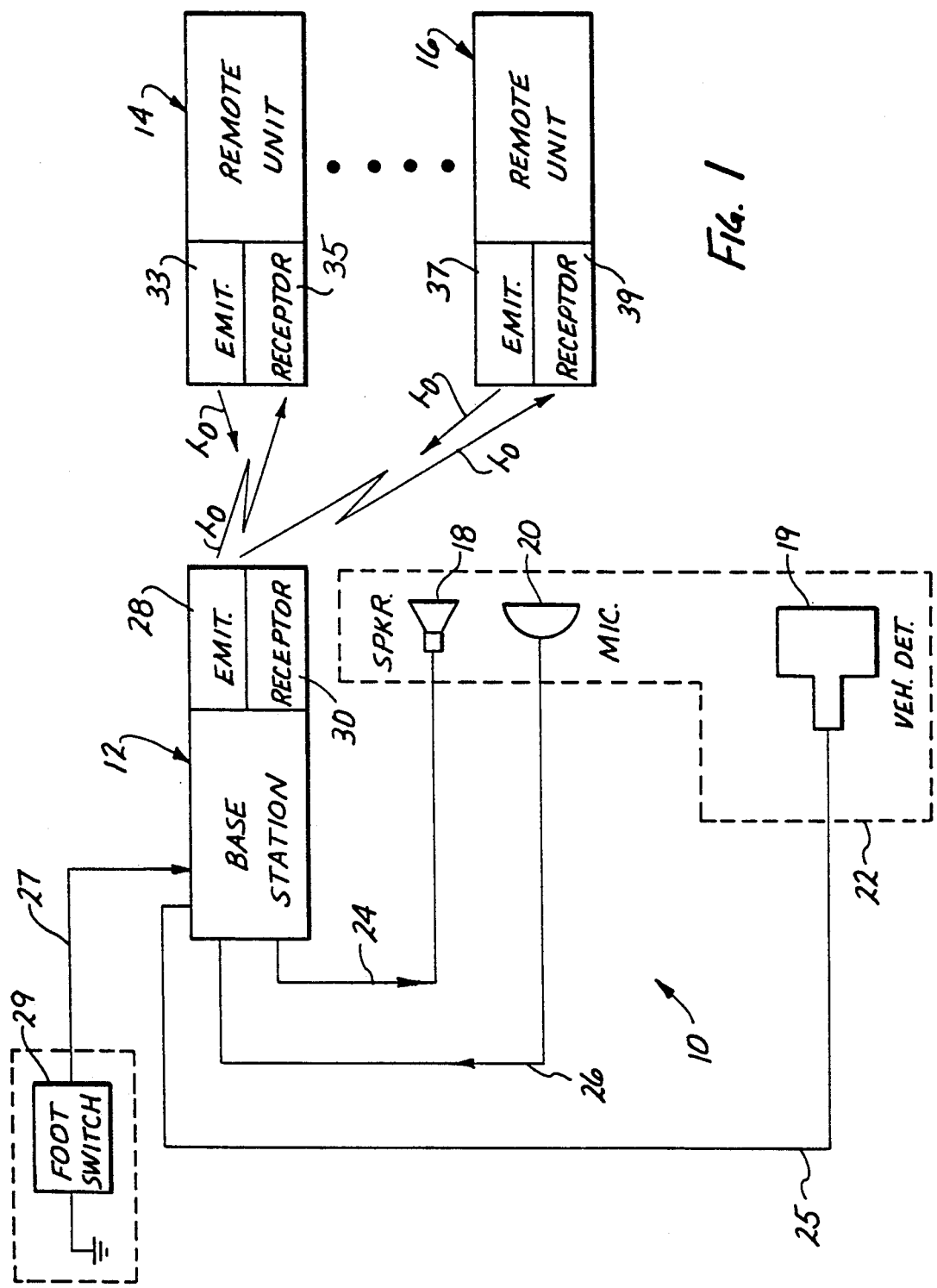
FIG. 1 is a functional block diagram of a communication system, which is constructed in accordance with the present invention, and which operates utilizing a single wavelength carrier arrangement.

Referring to the drawings, and more particularly to FIG. 1, there is illustrated a wireless infrared full duplex communication system 10, which is constructed in accordance with the present invention, and which is adapted for use as an intercom system. Thus, the system 10 is a single wavelength carrier system, and can be used in commercial establishments, such as fast food drive-through restaurants or similar institutions.

While the preferred form of the present invention is designed to be used in a fast food restaurant for audible communications, it will become apparent to those skilled in the art that the principles of the present invention may be employed for other applications as well. For example, the information being communicated may include data, audio, combinations thereof, and others. Additionally, the wireless communication system of the present invention may be used in other environments, such as restaurants where the food is consumed on the premises and order as taken from customers waiting in a queue. Additionally, the inventive wireless communication system may be utilized in a factory setting, where transportable or portable computers or terminals are moved from place to place, to enable data and other information to be entered. Furthermore, the inventive wireless communication system may be employed in an office setting where computers and other such equipment are being networked, and it is desired to interconnect them without the need for cables.

The system 10 generally includes a repeating base station or unit 12, for interconnecting in optical communication a group of similar remote units or stations such as remote units 14 and 16. While only two remote units 14 and 16 are shown for illustration purposes, it will become clear to those skilled in the art, that many more remote units (not shown) may also be used. The remote units are adapted to be carried by the personnel of the fast food restaurant. The personnel typically include an order taker and food preparation people.

A speaker 18, a vehicle detector 19 and a microphone 20, are disposed at a remote customer location 22 where a customer seated in a vehicle (not shown) can place an order by talking into the microphone 20. The speaker 18, the detector 19 and the microphone 20 are connected to the base station 12 by respective electrical cables 24, 25 and 26. Although the speaker 18 and the microphone 20 are shown as separate units in the preferred embodiment it should be understood that a single speaker/microphone such as disclosed in U.S. Pat. No. 3,987,245 could be utilized in lieu of the separate units.

A portable footswitch 29 located inside the restaurant may also be connected to the base station by an electrical cable 27 to enable restaurant personnel to activate his or her remote unit in a hands free manner, by merely stepping on the switch 29. The base station also includes an emitter 28 and a receptor 30. The remote units also each contain an emitter and a receptor. For instance, the remote unit 14 includes an emitter 33 and a receptor 35, and the remote unit 16 includes an emitter 37 and a receptor 39. As indicated in FIG. 1, the emitters and receptors communicate with one another at a light carrier wavelength, preferably at a wavelength of 880 nm.

A. Single Optical Wave Length Multiplexing System

Figure 2:
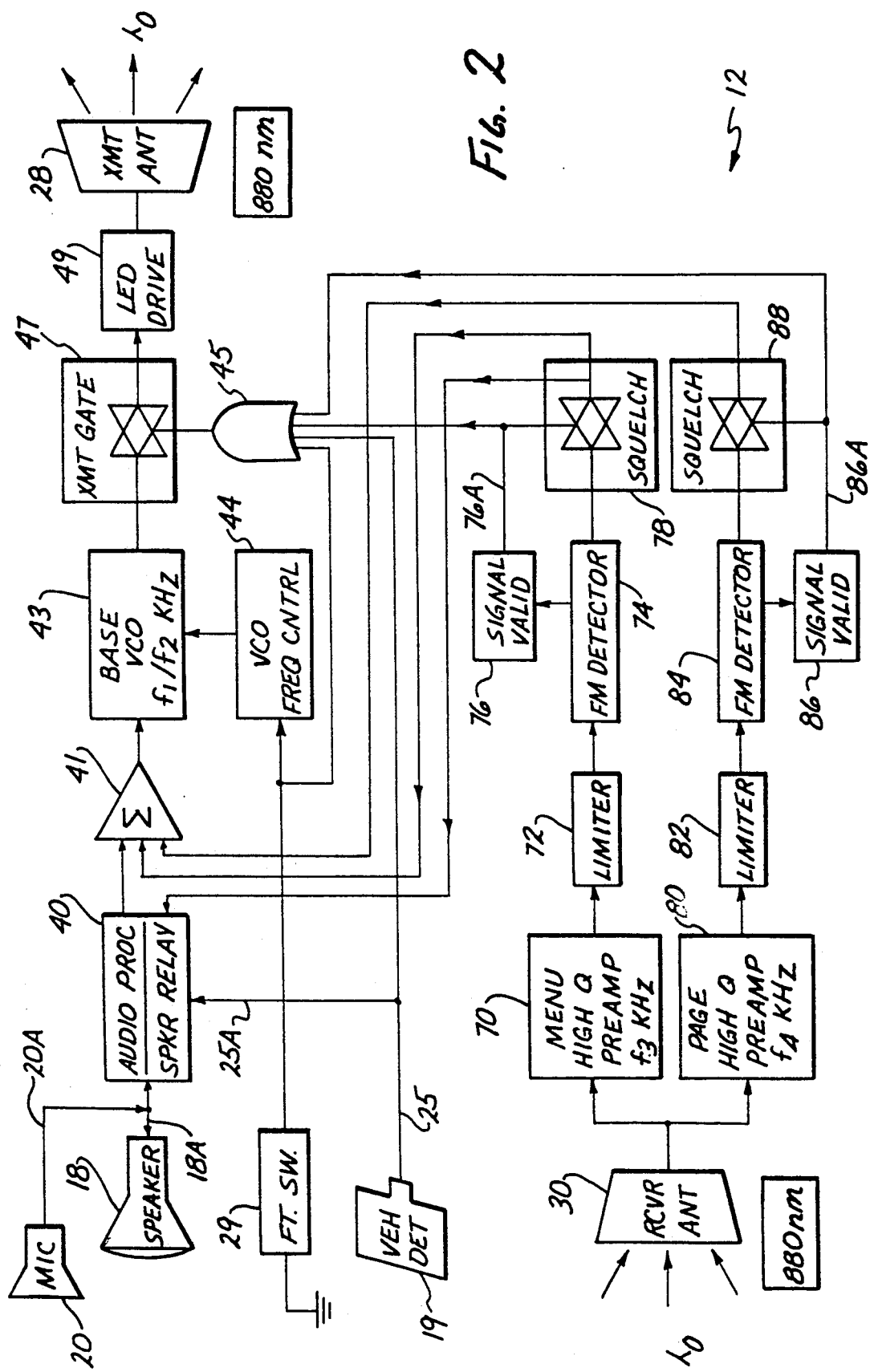
FIG. 2 is a functional block diagram of the base station of FIG. 1.

Considering now the operation of the system 10 with reference to FIGS. 2 and 3, the system 10 utilizes a single optical wavelength, generally designated as $\lambda_0$ for establishing a full duplex communication link between the base station 12 and all of the remote units, such as remote units 14 and 16. The system further uses a discrimination technique for achieving full duplex transmission as hereinafter disclosed in greater detail. It will become apparent to those skilled in the art that a single communication channel can be dedicated to each remote unit, and the remote customer location, whereby each channel is allotted a discrete wavelength and/or electrically selective preamplifier combination for achieving the necessary infrared isolation for full duplex transmission.

1. GENERAL OPERATION

Considering now the communication path between the customer location 22 and the remote units, assume a customer drives to the remote customer location 22 in a vehicle (not shown). When the vehicle is disposed opposite the customer location 22, the vehicle detector circuit 19, which includes a vehicle sensor (not shown) activated by the vehicle, generates a signal which is transmitted to the base station 12 via a cable 25. This signal is used to cause, in turn, a tone signal to be generated for alerting all the remote units that a customer is present. The vehicle detection circuit 19 is conventional, and may be a unit, such as model 3630314 sold and manufactured by Indicator Control Corporation, or model 93501 sold by Detector Systems. When a customer's vehicle is present at the remote customer location 22, the vehicle detection circuit generates an enablement signal. The customer places an order or message verbally via the microphone 20. The audio message is communicated electrically to the base station 12 over the cable 26, where it is modulated and optically transmitted to all the remote units.

The remote units, such as the remote units 14 and 16, are generally identical to one another, and therefore, only the unit 14 will be described hereinafter in greater detail with reference to FIG. 3. The optical message is detected by the remote unit 14, where it is demodulated into an audio signal.

2. BASE UNIT

As illustrated in FIG. 2, the base station 12 includes an audio processing-speaker rely circuit 40 and a summing amplifier 41 to process and amplify the incoming audio signal from the microphone 20, as well as the enablement signal from the vehicle detector 19. A base station voltage controlled oscillator 43 hereinafter referred to as base VCO, modulates the incoming audio signal on one of two predetermined subcarrier frequencies generally designated as $f_1$ and $f_2$ KHz, respectively. The base VCO 43 is controlled by a VCO frequency control circuit 44 which enables the base station VCO 43 to change its predetermined subcarrier frequency between the two discrete frequency values $f_1$ and $f_2$. The operation of the VCO frequency control circuit 44 will be described hereinafter in greater detail.

As best seen in FIGS. 1 and 2, the base station 12 has attached to it via an electrical cable 27, the portable footswitch 29, such as a footswitch marketed under the identification as Model #862-1990-02 manufactured by Control International. The function of the footswitch 29 is to enable a user to communicate with a customer at the customer location 22 by actuating the footswitch 29 and placing a verbal message via the microphone of a designated remote station, such as microphone 94 of remote unit 14. In this regard, when the footswitch 29 is activated (depressed), the base station 12 modulates the audio signal on subcarrier frequency $f_2$. Conversely, when the footswitch 29 is not activated, the base station modulates the audio signal on subcarrier frequency $f_1$.

The footswitch 29 is operated in conjunction with a footswitch control switch 90C disposed on control module 90. The operation of footswitch 29 with control switch 90C will be described hereinafter in greater detail.

For the purpose of describing the communication path between the customer location (microphone 20) and the remote units via the base station 12, the mode of communication will hereinafter be referred to as the "BASE MENU/PAGE" mode. In the BASE MENU/PAGE mode of operation, the audio signal produced by the customer via microphone 20 is modulated on a subcarrier frequency designated as $f_1$. The modulated signal is then transmitted on the single optical or wavelength $\lambda_0$ that is common to the base station 12 and all the remote units, such as remote units 14 and 16.

A transmission enable gate generally designated as XMT gate 47 controls the output of the base VCO 43 via a logic gate 45. Logic gate 45 controls or enables the XMT gate 47 only when a certain valid condition exists as hereinafter explained in greater detail. Thus, the modulated audio signal on subcarrier frequency $f_1$ is allowed to be transmitted, selectively as will be described hereinafter in greater detail, only when the logic gate 45 receives a valid transmission condition on its input.

An LED drive or light emitter drive circuit 49 has its input connected to the output of the XMT gate 47 and its output to the light emitting optical antenna 28. Antenna or emitter 28 transmits the outgoing signal at the single wavelength $\lambda_0$ to all remote units. The LED drive 49 and optical antenna 28 are conventional and well known to those skilled in the art. Thus, the single carrier wavelength signal $\lambda_0$ radiated or emitted by the XMT antenna 28 is received by the receptor of all the remote units, such as the receptor light receiving optical antenna 35 of the unit 14.

For the purpose of causing the receptor light receiving optical antenna 30 of the base station to be isolated from the infrared transmission signal being transmitted by its emitter 28, the base station 12 includes a pair of high Q preamplifier circuits 70 and 80 which are connected to the base station receptor 30. The high Q preamplifier circuits 70 and 80 and designated respectively MENU and PAGE, permit only those signals modulated on subcarrier frequencies being transmitted by the remote units, to be passed to their respective outputs for demodulation purposes. Thus, the MENU and PAGE circuits 70 and 80 convert the received signal from a light wave modulated signal into a radio frequency modulated signal and allow only those signals having a subcarrier frequency as generated by the remote units, such as remote units 14 and 16, to be passed.

Considering now vehicle detection circuit 19 in greater detail with reference to FIG. 2. Whenever a customer's vehicle (not shown) is present at the customer location 22, the vehicle detector 19 generates an enablement signal which is transmitted to the base station via electrical cable 25. The electrical cable 25 is connected to the audio processing speaker relay circuit 40 and to the logic gate 45.

Thus, when the detector 19 generates its enablement signal, the output of logic gate 45 becomes true, thereby enabling the base station 12 to transmit an outgoing audio signal through its XMT gate 47 to all of the remote units via the emitter 28.

In response to the enablement signal generated by the vehicle detector 19, a tone generator 40F in the audio processing speaker relay circuit 40 is activated so that the presence of a customer vehicle enables the tone generator 40F to generate a low level beep signal which, in turn, is transmitted to all the remote units. In this manner, the presence of a customer vehicle at the remote customer location 22 can be sensed by all the remote units simultaneously to attract the attention of the restaurant personnel.

Considering now the audio processing speaker relay circuit 40 in greater detail with reference to FIG. 8, the circuit 40 has three input paths: an input path shown as 20A from the remote customer location microphone 20; an input path shown as 25A from the vehicle detector system 19; and an input path shown as 40J derived from a MENU squelch amplifier 40I, which will be described hereinafter in greater detail.

Considering now the audio processing speaker relay circuit 40 in greater detail with respect to the input path 20A, the input signal received on input 20A is generated from the remote customer location microphone 20. This signal is considered to be an inbound audio signal from a customer, and is repeated back to the remote units.

As best seen in FIG. 8, the inbound signal from the microphone 20 is coupled through the speaker relay 40A to an inbound contact 40A1 via connector 20A. The output of speaker relay 40A is connected to the input of a high pass filter 40B. The high pass filter 40B improves the frequency response of signals on input path 20A.

The output signal from the high pass filter 40B is then passed through a limiter 40C, whose output feeds a summing amplifier 40D. The output of the summing amplifier 40D drives a compressor circuit 40E whose output is connected to the summer circuit 41.

Considering now the second input to the speaker relay circuit 40A in greater detail, this input is connected, as illustrated by line 40J, from the output of amplifier 40I. The output signal of amplifier 40I is an audio signal received from a remote station which is intended to be transmitted to the remote customer location speaker 18. Therefore, whenever an outbound signal is received by the speaker relay circuit 40A, it switches from its inbound contact position 40A1 to an outbound contact position 40A2 thereby coupling the outbound audio signal to speaker 18 via a line 18A. As there is a separation in the electrical path between the inbound contact position 40A1 and the outbound contact position 40A2, the outbound signal is not passed to high pass filter 40B, and thus is not retransmitted by the base station 12.

Considering now the input path 25A to the audio processing speaker relay circuit 40, the input signal received on input 25A is the enablement signal generated by the vehicle detection system 19. This signal is connected to the input of a tone generator 40F, which generates the low level beep audio signal. The output of the tone generator 40F is coupled to the input of summing amplifier 40D. Summing amplifier 40D passes the beeping signal to summer 41. The output of summer 41 drives base VCO 43, which modulates the signal on a selected subcarrier frequency $f_1$ or $f_2$. The modulated signal is then passed through the XMT gate 47 which is enabled by gate 45. Thus, the periodic audio beep signal is transmitted by the base station to all the remote units. In this manner, all the remote station attendants can be aware of the presence of a customer's vehicle at the remote customer location 22.

Considering now the input path 78A to the audio processing speaker relay circuit 40 in greater detail, with reference to FIG. 8, the signal received from amplifier 40I is derived from the MENU squelch circuit 78. As best seen in FIGS. 2 and 8, the output signal of the menu squelch circuit 78, is coupled to a low pass filter 40G as illustrated by the line 78A. For signal conditioning purposes, the output of the low pass filter 40G drives an expander circuit 40H whose output is connected, in turn, to the input of amplifier 40I.

Figure 4:
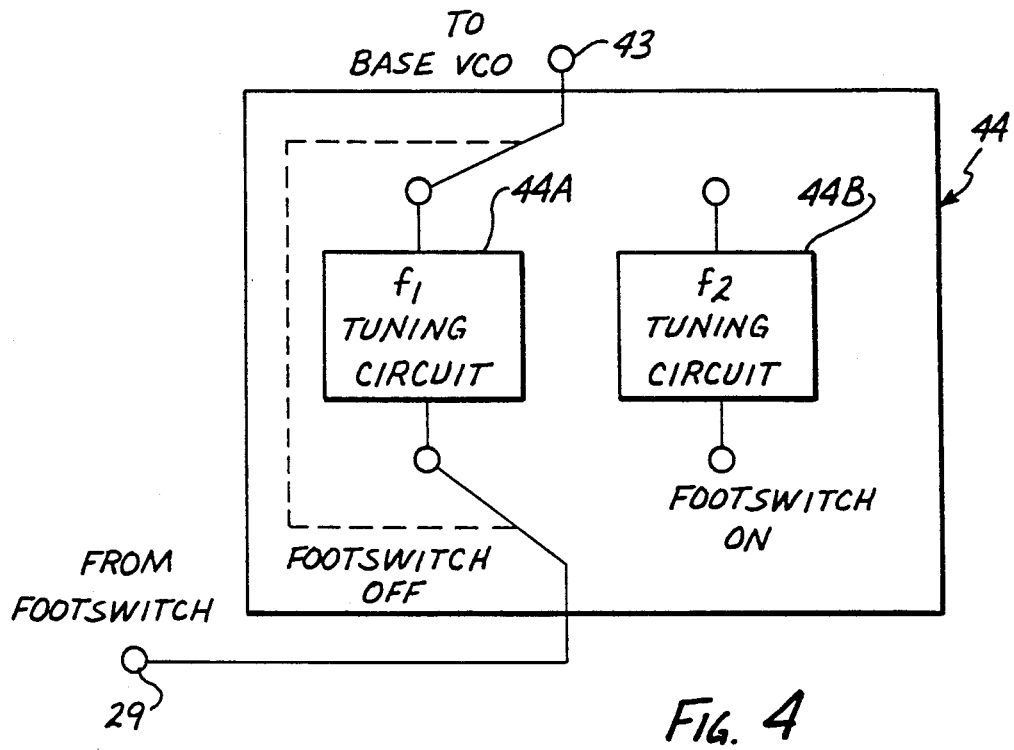
FIG. 4 is a functional block diagram of the voltage controlled oscillator frequency control circuit of the base station of FIG. 2.

Considering now the VCO frequency control circuit 44 in greater detail with reference to FIG. 4, the VCO frequency control circuit 44 controls the frequency at which the base unit voltage control oscillator 43 operates. More particularly, the VCO frequency control circuit 44 enables the base unit voltage controlled oscillator 43 to change its predetermined subcarrier frequency between two discrete frequency values designated as $f_1$ and $f_2$. The purpose of changing the subcarrier frequency from $f_1$ to $f_2$ will be described hereinafter in greater detail.

The VCO frequency control circuit 44 includes a pair of tuning circuits 44A and 44B which establish the subcarrier frequency component signals $f_1$ and $f_2$, respectively. As illustrated in FIG. 4 when the footswitch 29 is off or deactivated, the output of tuning circuit 44A is coupled to the base VCO circuit 43. When the footswitch 29 is activated or on, the tuning circuit 44B is activated and the output of the $f_2$ tuning circuit 44B is coupled to the base VCO circuit 43.

Considering now the remote unit 14 with reference to FIG. 3, the message-carrying optical carrier wavelength signal $\lambda_0$ impinges on the light detecting antenna receptor 35. The output of the receptor 35 is connected to a pair of high Q preamplifier circuits 110 and 120, which pass only those modulated signals modulated on subcarrier frequencies $f_1$ and $f_2$ being transmitted by the base unit to be passed to their respective outputs for demodulation purposes. Thus, only those signals having a subcarrier frequency $f_1$ as generated by the base unit 12, are passed through the high Q preamplifier circuit 110 and only those signals having a subcarrier frequency $f_2$ as generated by the base unit 12 are passed through the high Q preamplifier circuit 120.

In the BASE MENU/PAGE mode the modulated audio signal is normally modulated on subcarrier frequency $f_1$. In this regard, the high Q $f_1$ preamplifier circuit 110 passes the modulated $f_1$ signal to its output, while the high Q $f_2$ preamplifier circuit 120 attenuates, if not totally eliminates the $f_1$ signal from being passed to its output.

The output of the $f_1$ circuit 110 is connected to a conventional radio frequency limiter circuit 112 for conditioning the passed modulated signal to be demodulated. More particularly, the limiter 112 conditions the signal so that it has a constant amplitude. The output of limiter 112 is connected to an FM detector demodulator 114 which removes the wavelength carrier signal from the received signal.

Considering now the FM detector circuit 114 in greater detail with reference to FIG. 3, the FM detector circuit 114 has a pair of outputs shown as 115A and 115B, respectively. The first output is connected to the $f_1$ squelch gate 118 via connector 115A. The second output is connected to the signal valid circuit 76 via connector 115B. The FM detector circuit 114 is a conventional FM detector demodulator and demodulates the audio signal from the $f_1$ subcarrier frequency.

The signal output on connector 115A of the FM detector 114 is the transmitted incoming audio signal generated by the customer via the microphone 20. The output signal on connector 115B is a dc level representation of the received radio frequency signal. The signal valid circuit 116 uses this signal to determine if the received radio frequency signal passed by the FM detector 114 is valid for the purposes of squelching extraneous or noisy signals from the audio signal and for enabling valid audio signals to be amplified as will be described hereinafter in greater detail.

If the signal valid circuit 116 determines a valid dc level representation of the radio frequency signal is present, it generates a reception enablement signal at its output generally designated 117. The output 117 is connected to an audio power control gate 130 whose output 130A is connected to a final stage audio amplifier processing circuit 132. In this configuration, the audio power control gate 130 enables the amplifier 132 to be powered. The output of amplifier 132 is connected to a remote unit speaker or earphone, such earphone 133 so that the audio signal may be heard by a person stationed at remote unit 14.

For the purpose of amplifying only valid audio signals, the remote unit 14 also includes a reception enable or squelch gate 118. The squelch gate 118 when enabled passes the audio output of the FM detector 114 to a summing amplifier 131. The summing amplifier 131 has its output connected to the audio amplifier 132 via line 131A. The squelch gate 118 is controlled by the signal valid circuit 116 and is connected to output 117. Thus, squelch 118 will only pass audio signals when the output of the signal valid circuit 116 is positive. Thus, the audio signal is allowed to be amplified, only when the signal valid circuit 116 generates an enable signal. In this manner, extraneous or FM noise signals are blocked and only a substantial signal is passed.

Considering now the audio amplifier process or final stage amplifier circuit 132 in greater detail with reference to FIGS. 3 and 5, for signal conditioning purposes, the audio amplifier process circuit 132 includes a de-emphasis circuit 161, an expander circuit 163 and an amplifier circuit 165. The output of the summer circuit 131 is connected to the input of the de-emphasis circuit 161. The de-emphasis circuit 161 passes this signal via its output 162 to the input of the expander circuit 163. The expander circuit 163 passes the signal to the input of the amplifier circuit 165. The amplifier circuit 165 has an additional input connected to the audio power control circuit 130. Thus, when the input signal received from the audio power control gate 130 is present, power is applied to the audio amplifier process circuit 165 so the audio signal may be amplified by amplifier 165.

Figure 7:
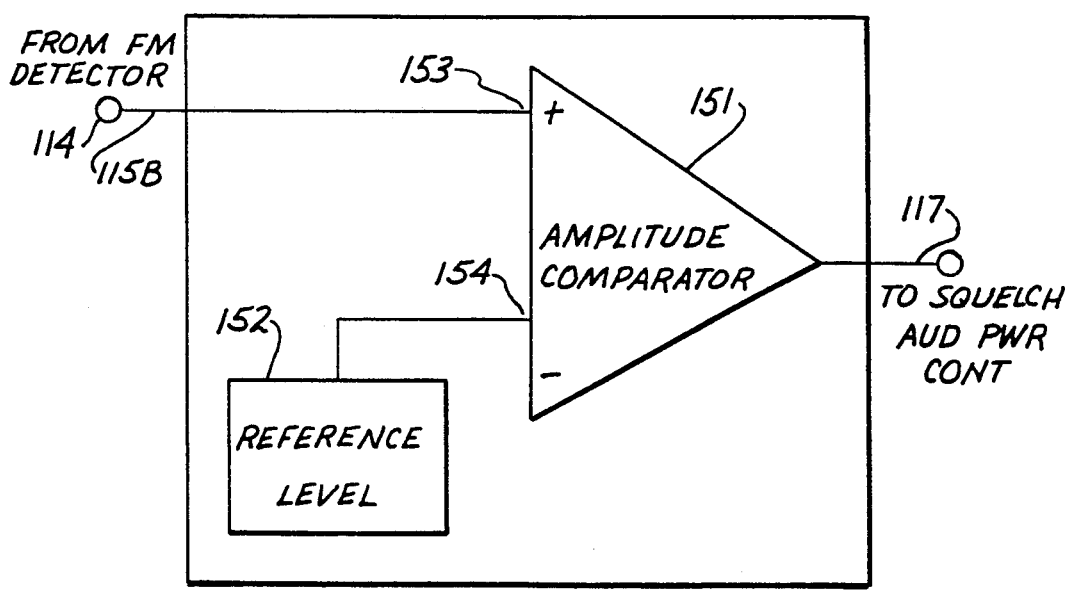
FIG. 7 is a functional block diagram of the signal valid circuit of the remote station of FIG. 3.

Considering now the signal valid or verifying circuit 116 in greater detail with reference to FIG. 7, the signal valid circuit 116 consists of a standard amplitude comparator circuit 151 and a reference level source 152. The comparator circuit 151 compares the dc level representation of the received radio frequency generated by the demodulator 114 with the reference level source 152. The dc level representation signal from the demodulator 114 is fed into the positive input 153 of the comparator 151. The reference level 152 is connected to the negative input 154 of the comparator 151.

In this manner, only those limited radio frequency signal levels, appearing at output 115B of the demodulator 114, exceeding the certain predetermined amplitude, will be passed. Thus, the output of the signal valid circuit 116 is used by the $f_1$ squelch gate 118 to squelch or not allowed to be passed signals with unwanted frequencies that were passed inadvertently by the high Q pre-amp circuit, and thus would otherwise cause an unwanted noise sound to be reproduced.

The comparator circuit 151 output 117 is connected to the squelch or reception enable gate 118 circuit, and the audio power control circuit 130.

Considering now the operation of the signal valid circuit 116, the signal valid circuit 116 generates an enabling logic signal on its output whenever the input signal received from the demodulator circuit 114 is comparable with the reference level 152. The input signal received from the FM detector 114 is a dc level representation of the received radio frequency signal. The enablement signal generated by the signal valid circuit 116 enables the squelch or reception enable gate 118 to pass the demodulated audio signal from the demodulator 114 to the summing amplifier 131 so the audio signal may be amplified and heard by a user via earphone 133. It should be understood that other well known techniques could be used to verify whether the modulated signal received by the FM detector is limited to only those audio signals that were modulated and transmitted to the remote unit on the subcarrier frequency $f_1$ and that the preferred method as described herein is not a limitation in the present invention.

2. REMOTE UNIT (a) MENU MODE: Considering now the communication path between the remote units, such as remote unit 14 and the remote customer location 22. The mode of communication will hereinafter be referred to as the "MENU" mode, wherein the audio signal transmitted by the remote unit is modulated on a subcarrier frequency designated as $f_3$ and transmitted on the single optical wavelength $\lambda_0$ as the base station 12 and the other remote units respectively.

As best seen in FIGS. 1 and 3, a person stationed at the remote unit 14 initiates the communication to remote customer location 22 by utilizing a control module 90 which includes a pair of switches 90A and 90B designated MENU and PAGE respectively. As will be explained hereinafter in greater detail, when the person stationed at the remote unit activates the PAGE mode by pressing switch 90B the user is able to communicate with all the remote units within the system 10 without the message being transmitted to the remote customer location 22. When the user activates the MENU mode, by pressing switch 90A the user is able to communicate with the remote customer location 22 and all remote units within the system are able to receive this communication via a retransmission or repeat feature within the base station 12. This retransmission feature will be described hereinafter in greater detail.

Once the user at the remote unit determines to communicate with the customer at the remote customer location 22, the user initiates communication by pressing and closing switch 90A of the control module 90. This selects the MENU mode of communication. The contact output of control module switch 90A is connected to the input of a mode select circuit 91. The mode select circuit 91 determines which mode of communication has been selected (MENU or PAGE). The mode selector circuit 91 has two outputs. The first output is connected to a VCO frequency control circuit 97 via connector 91A. The second output is connected to transmission or logic gate 92 via connector 92A.

Considering now the mode select circuit 91 in greater detail with reference to FIG. 3, the mode select circuit 91 performs two functions, enablement of the logic gate 92 whenever the MENU or PAGE switches 90A and 90B respectively are depressed on control module 90, and to generate a proper logic signal indicating when the PAGE switch 90B is depressed. This second logic signal is connected to the VCO frequency control circuit 97 via connector 91A as previously noted.

Considering now the output signals generated by the mode select circuit 91 in greater detail with reference to FIG. 3, the first output signal of the mode selection circuit 91 is connected via 91A to the VCO frequency control circuit 97 and is used to select or control the modulated subcarrier frequency that will be impressed on the outgoing audio signal of the remote unit 14. Since the operation of the VCO frequency control circuit 97 is substantially similar to VCO frequency control circuit 44 previously described, the circuit 97 will not be described in further detail. It should be noted however, that the circuit 97 rather than being controlled by the footswitch 29, is controlled by MENU and PAGE switches 90A and 90B respectively via the mode select circuit 91, and generates frequency signals $f_3$ and $f_4$ in lieu of $f_1$ and $f_2$. Also, the mode select circuit 91 normally selects the $f_3$ subcarrier frequency. Thus, whenever a user depresses the PAGE switch 90B selecting frequency $f_4$ and then releases the PAGE switch 90B, the mode select circuit 91 will automatically select the $f_3$ subcarrier frequency for future transmissions.

The second output of the mode selection circuit 91 is connected to the transmission or logic gate 92 whose output is connected to a transmission enable or XMT gate 93. The transmission enable gate 93 enables the outgoing audio message to be transmitted to the base station 12 as will be described hereinafter in greater detail.

Once the user has activated the MENU switch 90A, the user places a message verbally via a headset microphone 94 whose output is connected to an audio processing circuit 95. The audio processing circuit 95 amplifies, equalizes, and compresses the signal for the purpose of modulation.

Considering now the audio processing circuit 95 in greater detail with reference to FIG. 6, the audio processing circuit 95, for signal conditioning purposes, the audio processing circuit includes a limiter circuit 95A, a preamplifier circuit 95B, a compressor circuit 95C, and a pre-emphasis circuit 95D, which are connected in series with one another. The output of the microphone 94 is coupled to the input of the limiter circuit 95A, and the input to the remote or COM VCO circuit 96 is coupled to the output of the pre-emphasis circuit 95D. The output of the audio processing circuit 95 is connected to a common voltage controlled oscillator 96, which modulates the outgoing audio signal on the predetermined subcarrier frequency $f_3$.

The output of transmission gate 93 is connected to a light emitting diode driver circuit 99. Thus, when the modulated signal passes through the XMT gate 93 it is further modulated on the single wavelength $\lambda_0$ for transmission to all the other remote units as well as the base unit 12.

Considering now the logic gate 92 in greater detail with reference to FIG. 3, the output of the logic gate 92 is connected to the XMT gate 93 and enables the XMT gate 93 to pass the modulated signal whenever the logic gate 92 is positive. The logic gate 92 has two inputs either of which being true, enables its output to be true. One input is driven by the output of the select circuit 91 so that whenever a user selects either the MENU mode or the PAGE mode (which will be described hereinafter in greater detail) of transmission, the logic gate 92 enables the XMT gate 93 to pass modulated signals. The other input to the logic gate 92 is connected to a footswitch control switch 90C, which will be described hereinafter in greater detail. It should be noted however, that whenever the footswitch control switch 90C is activated, the output of logic gate 92 will be enabled if the output signal of the signal valid circuit 126 is true which would be indicative of an audio signal being received that was modulated on the $f_2$ subcarrier frequency. Thus, whenever the footswitch control switch 90C is activated and an audio signal is received by the remote that is modulated at the $f_2$ subcarrier frequency, the logic gate 92 goes positive thereby enabling the XMT gate 93. When the XMT gate 93 is enabled in this manner, the mode of communication is designated as the "BASE FOOTSWITCH" mode (which will be described hereinafter in greater detail).

The output of the light emitter drive circuit 99 is connected to the input of the transmission antenna 33. In this configuration, the outgoing audio signal modulated on the subcarrier frequency $f_3$ is further modulated at the single wavelength $\lambda_0$ via an emitter or light emitting optical antenna 33 which transmits the message carrying signal to the base station 12. Thus, the signal radiated or emitted by the emitter 33 is received by the receptor 30 of the base unit 12, as well as the receptor of all the remote units including remote unit 14.

For the purpose of causing the receptor 35 of the remote unit to be isolated from the infrared transmission signal being transmitted by its emitter 33, the output of the receptor 35 is connected to the high Q preamplifier circuits 110 and 120 which permit only those signals having a subcarrier frequency as generated by the base unit to pass through their circuits.

Considering now the base unit 12 with reference to FIG. 2, the message carrying optical signal transmitted at $\lambda_0$ frequency impinges on the light detecting receptor or antenna 30. The output of the receptor 30 is connected to the high Q preamplifier circuits 70 and 80 which permit only those signals having a subcarrier frequency as generated being by the remote units to pass through their circuits for demodulation purposes. Thus, only those signals having a subcarrier frequency as generated by the remote units, are selectively passed through the respective Menu and Page preamplifier circuits 70 and 80.

Referring now to FIG. 2, in the MENU mode the modulated audio signal is modulated on the subcarrier frequency $f_3$. In this regard, the MENU preamplifier circuit 70 passes the modulated signal to its output, while the PAGE preamplifier circuit 80 attenuates, if not totally eliminates, the signal from being passed to its output.

The output of MENU preamplifier circuit 70 is connected to a conventional radio frequency limiter circuit 72 for conditioning the passed signal to be demodulated.

The output of the limiter 72 is connected to an FM detector demodulator 74 which removes the carrier frequency signals from the received signal. Thus, the output of the FM detector 74 is the transmitted outgoing audio signal generated by the remote unit user via the handset microphone 94. The FM detector 74 has a second output which is connected to a signal valid circuit 76 which determines whether or not a valid signal is present. If the signal valid circuit 76 determines a valid signal is present, it generates a reception enablement signal at its output.

The output of the signal valid circuit 76 is connected as illustrated by line 76A to a MENU squelch gate 78 and to the logic gate 45. The output of the MENU squelch gate 78 is connected to the input of the audio processing speaker relay circuit 40 previously described, so that the outgoing audio signal transmitted by the remote unit may be heard by a customer through the speaker 18.

For the purpose of permitting all the remote units to receive the transmitted outgoing audio signal, the summing amplifier 41 also includes an input which is connected to output 78A of the MENU squelch gate 78. Thus, the outgoing audio signal received by the base station 12 may then be modulated on the subcarrier frequency $f_1$ via the base voltage controlled oscillator 43 as previously described. This modulated signal is then gated to the base emitter 28 via emitter drive circuit 49 that is connected to the output of the transmission gate 47. The output of logic gate 45 is driven positive, thereby enabling transmission gate 47 to pass the modulated signal from base VCO circuit 43, via the signal received through the MENU squelch circuit 78.

Thus, it should be understood that the transmission gate 45 enables transmission of modulated outgoing audio signals to all the remote units.

It should be understood that the base station 12 also transmits the modulated outgoing audio signal back to the remote unit which generated the outgoing audio signal. This message is thus received by the remote unit, passed through its high Q $f_1$ circuit 110, demodulated, and via the remote unit earphone 133, heard by the person who placed the verbal message. This effect is known as the loop around side tone and enables the user to know that the placed message was properly received by the base station 12 and all the remaining remote units in the system 10.

(b) PAGE MODE: Considering now the PAGE mode communication path between a remote unit, and the base station 12 to all the other remote units, with reference to FIGS. 1-3, a person stationed at the remote unit 14 initiates the communication to the base station 12 by pressing and closing the page switch 90B of the control module 90 to select the PAGE mode of the communication. The page switch output of the control module 90 is connected to the mode select circuit 91. When the page switch 90B is activated it causes the mode select circuit 91 to generate a frequency select signal and a transmission enable signal at its two respective outputs. The frequency select output of the mode select circuit 91, as illustrated by line 91B, is connected to the VCO frequency control circuit 97. Whenever the PAGE switch 90B is depressed the mode select circuit 91 causes the VCO frequency control circuit 97 to select the $f_4$ tuning circuit so the voltage controlled oscillator 96 can generate the $f_4$ subcarrier frequency for modulating the outgoing audio signal. The output of the VCO frequency control circuit 97 is connected to the remote unit voltage control oscillator 96 which now will modulate the outgoing audio signal on the predetermined subcarrier frequency $f_4$.

The user then places the verbal message via the headset microphone 94 and the message is transmitted by the remote unit 12 as described heretofore; however, in the PAGE mode, the message is transmitted on a carrier wavelength $\lambda_0$ having the audio signal modulated at the $f_4$ subcarrier frequency, as opposed to the $f_3$ subcarrier frequency. Thus, the signal radiated or emitted by the remote unit emitter 33 is received by the base unit 12, as well as the receptor of all the remote units, including the transmitting remote unit 14.

As noted earlier, the remote units within the system, each include a pair of high Q preamplifier circuits, such as circuits 110 and 120. These circuits permit only those signals having a subcarrier frequency $f_1$ or $f_2$ as generated by the base unit 12, to pass through their respective circuits. Thus, although the remote units receive the transmitted signal modulated on the $\lambda_0$ carrier wavelength, the radio frequency modulated audio signal is blocked from being demodulated as previously described.

Considering now the base unit 12 with reference to FIG. 2, the message carrying optical signal transmitted at $\lambda_0$ wavelength impinges on the light detector receptor 30. As the subcarrier frequency of the signal is $f_4$, the signal is passed through the PAGE high Q preamplifier circuit 80 to its output, while MENU circuit 70 attenuates, if not totally eliminates the signal from being passed to its output.

The output of PAGE circuit 80 is connected to a radio frequency limiter circuit 82 for conditioning the passed signal to be demodulated. The limiter circuit 82 is substantially identical to limiter circuit 112 as described herein and thus, will not be hereinafter described in greater detail.

The output of limiter 82 is connected to a conventional FM detector demodulator circuit 84 which removes the subcarrier frequency signal from the received signal. Thus, the output of the FM detector 84 is the transmitted outgoing audio signal generated by the remote unit user via the headset microphone 94.

The FM detector 84 also includes a second output, which is connected to a signal valid circuit 86 to determine whether or not a valid signal is present. The signal valid circuit 86 is substantially similar to signal valid circuit 76 described herein. If the signal valid circuit 86 determines a valid signal is present, it generates a reception enablement signal.

The output of the signal valid circuit 86 is connected to the PAGE squelch gate 88 and to the logic enable gate 45 as illustrated by line 86A. The output of the PAGE squelch gate 88 is only connected to the summing amplifier 41, and not the audio processing speaker relay circuit 40. Thus, the PAGE signal is not transmitted to the remote customer speaker 18, and the customer is thus prevented from hearing the transmitted message.

As the summing amplifier 41 receives the audio signal passed through the PAGE squelch gate 88 and the transmission enable gate 47 is opened via the signal generated by the signal valid circuit (via logic gate 45), the audio signal is modulated by the base voltage controlled oscillator 43 and transmitted to all the remote units as previously described.

3. MISCELLANEOUS TRANSMISSIONS

Considering now the operation of footswitch 29 and footswitch control switch 90C with reference to FIGS. 2 and 3, footswitch 29 is connected via connector 29A to the VCO frequency control circuit 44 which selects the subcarrier frequency at which the base station 12 will modulate transmitted audio signals. The footswitch 29 is also connected via connector 29B to the transmission or logic gate 45 which will enable or open the XMT gate 47 whenever the footswitch 29 is depressed. As previously noted, when the footswitch 29 is depressed or activated, the base station utilizes a subcarrier frequency of $f_2$. Also as previously noted this mode of communication is designated the "BASE FOOTSWITCH" mode.

Considering now the BASE FOOTSWITCH mode communication path between the base station 12 and a remote unit, such as remote unit 14, and all the other remote units, such as remote unit 16, a designated person, such as a supervisor, designates one of the remote units as a footswitch control unit and authorizes the attendant of that remote unit to place the footswitch control switch 90C on his or her control module 90 in the active position. It should be understood that only one remote unit, such as remote unit 14, will be designated to have its footswitch control switch 90C in the active position. Thus, all other footswitch control switches associated with other remote units will be in their inactive position as best seen in FIG. 3.

Normally, whenever a customer at the remote location 22 places a verbal message it is transmitted to the remote unit after being modulated on the subcarrier frequencies $f_1$. Such transmissions are heard by all the remote units. For a person at a remote station to respond to the customer at the remote customer location 22, that person must first depress the MENU switch 90A on his or her control module 90 and then speak into his or her remote station microphone, such as microphone 94.

In the BASE FOOTSWITCH mode, the audio signal received from the customer is modulated on the subcarrier frequency $f_2$. Such transmissions are received and heard by all remote units. For a person at a remote unit to respond to the customer at the remote customer location 22, that person must first depress the MENU switch 90A on his or her control module 90 and then speak into his or her remote station microphone, such as microphone 94. Thus, regardless of whether the message received is modulated on subcarrier frequency $f_1$ or $f_2$ the person stationed at the remote unit must first depress their MENU switch 90A to respond to the customer at the remote location.

As noted earlier however, one remote unit is designated to have its footswitch control switch 90C activated. With respect to this designated unit, the person stationed at that remote unit is not required to depress his or her MENU switch 90A, but rather may speak directly to the customer at the remote location 22 via his or her microphone 94.

As best seen in FIG. 3, and as previously explained, with respect to a designated remote unit, such as remote unit 14, the signal generated by the signal valid circuit 126 when the remote unit receives an audio signal modulated on the subcarrier frequency $f_2$ will go true. When this output signal goes true, the XMT gate 93 of the designated remote unit is enabled via logic gate 92. Thus, the person at the designated remote unit will speak into his or her microphone 94. This audio message will be modulated on the $f_3$ subcarrier frequency and transmitted to the base station 12. When the message is received by the base station 12 it is retransmitted back to all the remote units including the designated remote unit. The retransmission of the audio message however is modulated on the $f_2$ subcarrier by reason of the footswitch 29 being activated. The loop around side tone effect with the designated remote unit 14 therefore allows the output of the signal valid circuit 126 to remain true so hands free communication can take place.

Considering now the BASE FOOTSWITCH mode of communication in further detail, whenever an optical carrying message is transmitted by the base station 12 when it is in the BASE FOOTSWITCH mode, the signal is transmitted at a carrier wavelength $\lambda_0$ and is modulated on the subcarrier frequency $f_2$. This optical carrying message signal impinges on the receptors of all the remote units as well as receptor 30 of the base station 12.

As noted earlier, the base station 12 includes the MENU and PAGE high Q preamplifier circuits 70 and 80 which permit only those signals having a subcarrier frequency of $f_3$ or $f_4$ as generated by the remote units, such as remote units 14 and 16, to pass through their selective circuits. Thus, although the base station 12 receives its transmitted signal, the signal is blocked from being demodulated.

Considering now the remote unit 14 with reference to FIG. 3, the message carrying optical signal transmitted at wavelength $\lambda_0$ impinges on the light detector receptor 35. The output of the receptor 35 is connected to the input of both high Q preamplifier circuits 110 and 120. As the subcarrier frequency is now $f_2$ as opposed to $f_1$, high Q preamplifier circuit 120 passes the received signal, while high Q preamplifier circuit 110 attenuates, if not totally eliminates, the signal from being passed to its output.

The output of the high Q preamplifier circuit 120 is connected to a radio frequency limiter circuit 122 for conditioning the passed signal to be demodulated. The limiter circuit 122 is substantially similar to limiter circuit 112 described herein.

The output of limiter circuit 122 is connected to a FM detector demodulator circuit 124 which removes the subcarrier frequency signal from the received signal. Thus, the output of the FM detector circuit 124 is the base station transmitted signal whether generated by a customer at remote customer location 22 or by a remote unit user placing a verbal message via headset microphone 94.

The FM detector circuit 124 has a second output which is connected to a signal valid circuit 126 which determines if a valid signal is present. If the signal valid circuit 126 determines a valid signal is present, it generates a reception enablement signal that is coupled to the audio power control gate 130 whose output is connected to the audio amplifier processing circuit 132.

The output of the signal valid circuit 126 is also connected to a reception enablement gate 128 which enables the output of the FM detector 124 to be passed to the summing amplifier 131. Thus, the audio signal is allowed to be amplified via summer 131 which is connected to the input of the audio amplifier processing circuit 132.

The output of the signal valid circuit 126 is also connected to the open or active terminal of the footswitch control switch 90C. In this regard, the enablement signal generated by the signal valid circuit 126 is coupled to the transmission or logic gate 92 within one remote unit only, such as the remote unit 14. All the other transmission or logic gates in every other remote unit are unable to couple the output signal of their signal valid circuits to their transmission logic gate as their footswitch control switches, such as switch 90C, are in the inactive position; thus blocking the signal from reaching their logic gate such as logic gate 92.

The output of logic gate 92 is connected to the transmission gate 93 which enables the outgoing audio message generated by the active remote unit user to be transmitted to the base station 12 as previously described herein. Thus, when a person is designated and able to utilize the BASE FOOTSWITCH mode for communication, the designated person is able to communicate with the remote customer location 22 and all the remote units from any location within the system 10 without depressing the MENU or PAGE switches 90A and 90B. This feature therefore enables hands free communication by the designated remote unit user.

B. Multiple Optical Wave Length Multiplexing System

Figure 9:
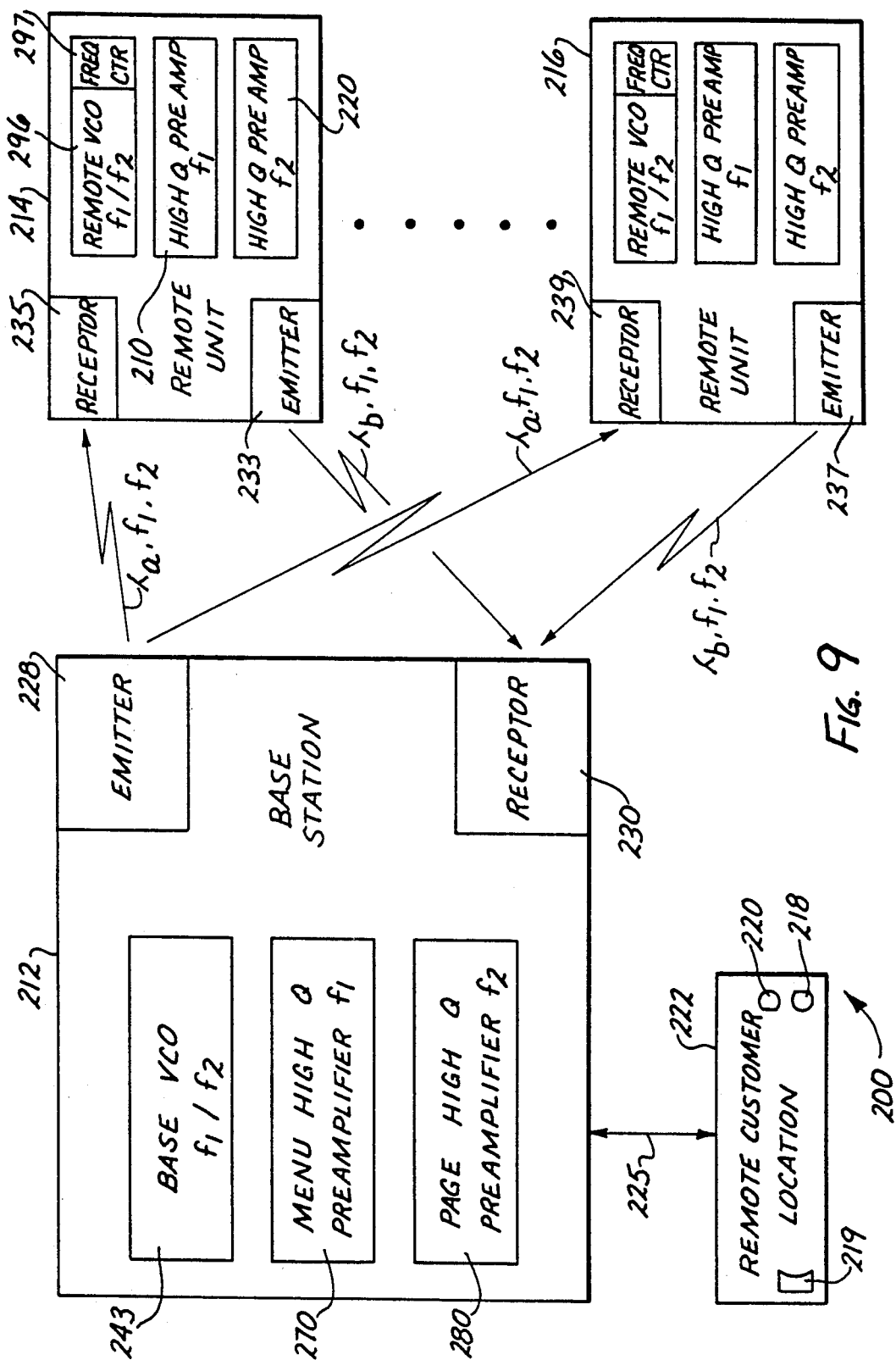
FIG. 9 is a functional block diagram of another communication system, which is also constructed in accordance with the present invention, and which operates utilizing a dual light wave carrier arrangement.

Referring to the drawings and more particularly to FIG. 9 thereof, there is illustrated a full-duplex wireless optical short-range frequency division multiplexing system 200, which is constructed in accordance with the present invention, and which is also adapted for use as an intercom system.

The system 200 generally includes a repeating base station or unit 212, for interconnecting in optical communication a group of similar remote units or stations such as remote units 214 and 216. While only two remote units 214 and 216 are shown for illustration purposes, it will become apparent to those skilled in the art, that many more remote units (not shown) may also be used.

A speaker 218, vehicle detector 219 and microphone 220 are disposed at a remote customer location 222 and are connected to the base station 212 via electrical cable shown as 225. These devices including their functions are similar to those described with respect to remote customer location 22.

Considering now the base station 212 in greater detail with reference to FIG. 9, the base station 212 includes an emitter 228 and a receptor 230 for full duplex optical communication, a base voltage controlled oscillator 243, a MENU high Q preamplifier 270, and a PAGE high Q preamplifier 280.

The system 200 is similar to the system 10, with the following exceptions. The base station 212, emitter 228 and receptor 230 are not matched to the same carrier wavelength frequency. In this regard, the emitter transmits signals at an optical carrier wavelength of 880 nm which is designated as $\lambda_a$, while the receptor receives signals at a different optical carrier wavelength designated as $\lambda_b$. It should therefore be understood that the signal emitted by the base station emitter is isolated from the base station receptor because the emitter and receptor are operated at different carrier wavelengths. Thus, light emitted from the emitters, such as the emitter 228, does not tend to interfere with the light wave communication received by the receptor, such as the receptor 230, of the same unit and thus, desensitization does not tend to occur, as would otherwise occur if they operate at the same wavelength.

The base voltage controlled oscillator 243 is identical to the base voltage controlled oscillator 43 previously described with reference to base station 12. The MENU and PAGE high Q preamplifier 270 and 280 are substantially identical to preamplifiers 70 and 80 previously described except that are constructed to convert the optical message carrying beam $\lambda_b$ into modulated audio signals having subcarrier frequencies of $f_1$ and $f_2$ respectively as opposed to converting the optical carrying message beam $\lambda_0$ into modulated signals having subcarrier frequencies of $f_3$ and $f_4$ respectively.

Considering now the remote units in greater detail with reference to FIG. 9, the remote unit 214 and 216 are similar to one another and only remote unit 214 will be described in greater detail.

Considering now remote unit 214 with reference to FIG. 9, remote unit 214 includes an emitter 233, a receptor 235, a remote voltage controlled oscillator and frequency control circuit 296 and 297, and a pair of high Q preamplifiers 210 and 220 respectively. The remote unit 214 is substantially similar to remote unit 14 previously described except for the following differences.

To achieve the same isolation technique as described with respect to base station 212 the emitter 233 and receptor 235 are not matched to the same carrier wavelength. Rather, the wavelength of the remote unit receptor 235 is matched to the carrier wavelength of the base unit emitter i.e. 880 nm or $\lambda_a$. Thus, optical message carrying signals generated by the base station 212 may be received by the receptors of each of the remote units, such as remote unit 214 and 216.

Similarly, the wavelength of the remote unit emitter 233 is matched to the carrier wavelength of the base unit receptor; i.e. wavelength $\lambda_b$. Thus, optical carrying messages generated by remote unit 214 may be received by the receptor 230 of the base station 212.

The remote unit voltage controlled oscillator frequency control 297 is identical to the voltage controlled oscillator frequency control circuit 97 described with reference to remote unit 14 except that the tuning circuits are tuned for the frequencies $f_1$ and $f_2$ as opposed to $f_3$ and $f_4$. In this regard, the remote unit voltage controlled oscillator 296 modulates the audio signal on subcarrier frequencies $f_1$ and $f_2$ as opposed to $f_3$ and $f_4$.

It should be understood that high Q preamplifiers 410 and 420 are identical to the high Q preamplifiers 110 and 120 previously described with reference to remote unit 14.

C. Multiple Optical Wave Length Multiplexing System with Multiple Subcarrier Frequencies Referring now to the drawings, and more particularly to FIG. 10 thereof, there is illustrated a full-duplex wireless optical short-range frequency division multiplexing system 400, which is also constructed in accordance with the present invention, and which is also adapted for use as an intercom system.

The system 400 generally includes a repeating base station or unit 412, for interconnecting in optical communication a group of similar remote units or stations such as remote units 414 and 416. While only two remote units 414 and 416 are shown for illustration purposes, it will become apparent to those skilled in the art, that many more remote units (not shown) may also be used.

A speaker 418, vehicle detector 419 and microphone 420 are disposed at a remote customer location 422 and are connected to the base station 412 via electrical cable shown as 425. These devices including their functions are similar to those described with respect to remote customer location 22.

Figure 10:
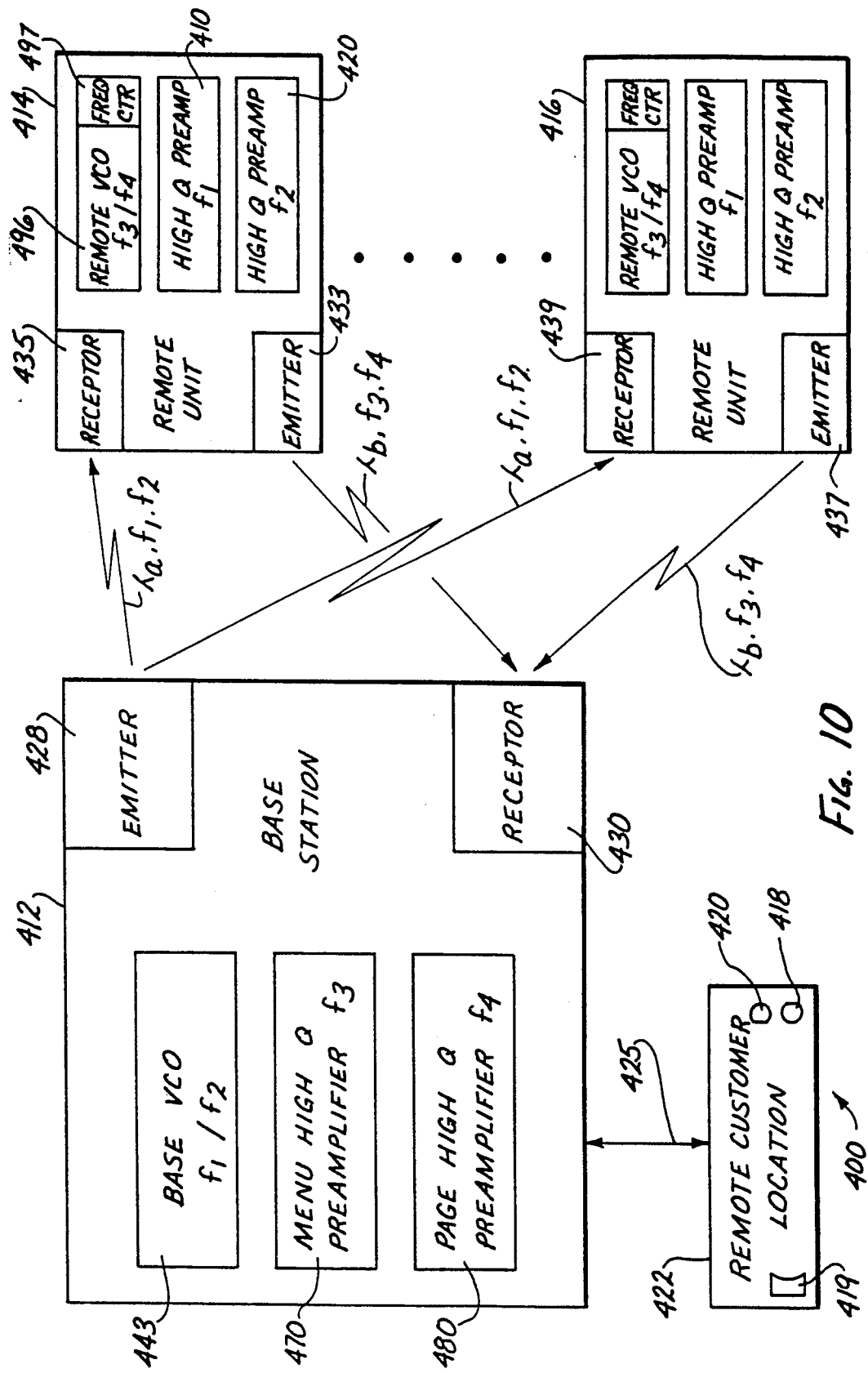
FIG. 10 is functional block diagram of yet another communication system, which is also constructed in accordance with the present invention, and which operates utilizing a dual optical wavelength carrier arrangement.

Considering now the base station 412 in greater detail with reference to FIG. 10, the base station 412 includes an emitter 428 and a receptor 430 for full duplex optical communication, a base voltage controlled oscillator 443, a MENU high Q preamplifier 470, and a PAGE high Q preamplifier 480.

The system 400 is similar to system 10, with the following exceptions. The base station 412, the emitter 428 and the receptor 430 are not matched to the same carrier wavelength, and thus operate at different carrier wavelength. These wavelengths are designated as $\lambda_a$ and $\lambda_b$, respectively. Thus, the reception of communications do not tend to become desensitized by light emitted from the same unit.

The base voltage controlled oscillator 443 is identical to the base voltage controlled oscillator 43 previously described with reference to the base station 12. The MENU and PAGE high Q preamplifiers 470 and 480 are substantially identical to preamplifiers 70 and 80 previously described except they are constructed to convert the optical message carrying beam $\lambda_b$ into modulated audio signals as opposed to converting the optical message carrying beam $\lambda_0$ into modulated audio signals.

Considering now the remote units in greater detail with reference to FIG. 10, the remote unit 414 and 416 are similar to one another and only remote unit 414 will be described in greater detail.

Considering now remote unit 414 with reference to FIG. 10, remote unit 414 includes an emitter 433, a receptor 435, a remote voltage controlled oscillator and frequency control circuit 496 and 497, and a pair of high Q preamplifiers 410 and 420 respectively. The remote unit 414 is substantially similar to remote unit 14 previously described except for the following differences.

The wavelength of the remote unit emitter 433 is not matched to the carrier wavelength of the remote unit receptor 435 carrier wavelength. The emitter wavelength is matched however to the base station receptor 430 frequency thus allowing communication between the base station 412 and all the remote units within the system 400, such as remote units 414 and 416.

Similarly, the wavelength of the remote unit receptor 435 is matched to the wavelength of the base station emitter 428, thus allowing communication between all the remote units and the base station 412. As this technique of isolation has heretofore been described with reference to system 200 no further detailed description will be provided herein.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A non-time division multiplexed wireless optical communication system comprising:
   a base unit for transmitting and receiving an optical message carrying beam having a predetermined wavelength;
   at least one remote unit for transmitting and receiving an optical message carrying beam having another predetermined wavelength;
   said base unit and said remote unit each including means for converting a message into an electrical message carrying signal, means for encoding a message carrying signal on a selected one of a plurality of subcarrier signals, control means for selecting a given one of said plurality of subcarrier signals for encoding purposes, communication means for transmitting an encoded message carrying signal on an optical message carrying beam, means for receiving an encoded message carrying signal on another optical carrying beam, conversion means for decoding said another optical message carrying beam when its associated subcarrier signal has been generated by some other unit.

2. A non-time division multiplexed wireless communication system as defined in claim 1, wherein the means for converting further includes means for connecting a microphone thereto for permitting a user to input a verbal message for communication purposes.

3. A non-time division multiplexed wireless full duplex optical communication system, comprising:
   a plurality of remote units for transmitting and receiving communication message signals, said message signals including outbound communication message signals and inbound communication message signals;
   each one of said plurality of remote units including encoding means for encoding said outbound communication message signals on one of a plurality of remote message carrying subcarrier signals;
   message destination means for causing said outbound communication message signals to be encoded on a selected one of said plurality of remote message carrying subcarrier signals;
   remote optical communication means for transmitting said selected one of said remote message carrying subcarrier signals on a remote optical carrier signal;

base station means for transmitting and receiving communication message signals;

said base station means including base optical communication means for receiving and decoding said remote optical carrier signal into said selected one of said remote message carrying subcarrier signals;

means responsive to said selected one of said remote message carrying subcarrier signals for decoding them into said outbound communication message signals;

retransmission means for causing selected ones of said outbound communication message signals to be encoded on a base message carrying subcarrier signal for retransmission purposes to said plurality of remote units;

means for encoding said base message carrying subcarrier signal on a base optical carrier signal for transmission to said plurality of remote units; and each one of said plurality of remote units further including means responsive to said base optical carrier signal for decoding it into said inbound communication message signals for utilization purposes.

4. A non-time division multiplexed wireless full duplex optical communication system according to claim 3 wherein said base station means further comprises:

base microphone means for converting a common message into an outgoing message carrying signal;

means for encoding said outgoing message carrying signal on another base message carrying subcarrier signal; and means for encoding the other base message carrying subcarrier frequency signal onto said base optical carrier signal.

5. A non-time division multiplexed wireless full duplex communication system as recited in claim 4, wherein said means responsive to said remote message carrying subcarrier frequency signal includes means for inhibiting demodulation of said remote message carrying subcarrier frequency signal when the optical carrier wavelength signal is a base optical carrier wavelength signal.

6. A non-time division multiplexed wireless full duplex optical communication system as recited in claim 4 wherein each one of said plurality of remote units further include a microphone for permitting a user to input a message for communication purposes.

7. A non-time division multiplexed wireless optical communication system as defined in claim 4, wherein said means for decoding further includes:

means for connecting a speaker thereto for permitting a user to physically hear the decoding message signals.

8. A non-time division multiplexed wireless optical communication system as defined in claim 7, further including a speaker disposed physically at a remote location, and connected electrically to said means for connecting a speaker.

9. A non-time division multiplexed wireless optical communication system as defined in claim 4, further including control means for selecting at least one said base message carrying subcarrier frequency signals for modulation purposes.

10. A non-time division multiplexed wireless full duplex optical communication unit for communicating with another similar unit, comprising:

means for generating an outgoing subcarrier signal for helping to facilitate transmitting outgoing message signals to the other unit;

means for encoding outgoing message signals on said outgoing subcarrier signal;

means for generating an outgoing optical carrier signal for transmission to the other unit;

means for encoding the message encoded outgoing subcarrier signal on the outgoing optical carrier signal;

means for receiving an incoming optical carrier signal having encoded thereon an incoming message encoded subcarrier signal from the other unit, said incoming and outgoing subcarrier signals being different sufficiently to prevent substantially interference between incoming and outgoing communications;

means responsive to receiving said incoming optical carrier signal for decoding said incoming subcarrier signal from said incoming optical carrier signal transmitted by said other unit; and means responsive to the decoded incoming subcarrier signal for decoding said incoming message signal from said incoming subcarrier signal, whereby sending and receiving messages are accomplished utilizing two different subcarrier signals to prevent substantially interference between the incoming and outgoing signals for the same unit during a full duplex mode of operation.

11. A non-time division multiplexed wireless optical communication system as defined in claim 10, wherein said means for inhibiting includes means for detecting remote message carrying subcarrier signals.

12. A non-time division multiplexed wireless optical communication system as defined in claim 11, wherein said means for detecting is a light receiving diode having a predetermined wavelength.

13. A non-time division multiplexed wireless optical communication system as defined in claim 12, wherein said means for transmitting includes a light emitting diode having a predetermined wavelength.

14. A non-time division multiplexed wireless optical communication system as defined in claim 13 wherein the predetermined wavelength of said light emitting diode and said light receiving diode is the same.

15. A non-time division multiplexed wireless optical communication system as defined in claim 13 wherein the predetermined wavelength of said light emitting diode and said light receiving diode are different.

16. A non-time division multiplexed wireless full duplex optical communication system, comprising:

a pair of optical communication means for communication therebetween in a full duplex mode of operation;

one of said optical communication means including means for generating an outgoing subcarrier signal for helping to facilitate transmitting outgoing message signals to the other optical communication means;

means for encoding the outgoing message signals on said outgoing subcarrier signal;

means for generating an outgoing optical carrier signal for transmission to the other optical communication means;

means for encoding the message encoded outgoing subcarrier signal on the outgoing optical carrier signal;

means for receiving an incoming optical carrier signal having encoded thereon an incoming encoded subcarrier signal from the other one of said optical communication means;

means responsive to receiving said incoming optical carrier signal for decoding said incoming encoded subcarrier signal from said incoming optical carrier signal transmitted by the other optical communication means;

means responsive to the decoded subcarrier signals for decoding said incoming message signal from said incoming subcarrier signal;

the other one of said optical communication means including;

means for generating said incoming subcarrier signal for helping to facilitate transmitting said incoming message signals to the first mentioned optical communication means;

means for encoding said incoming message signals on said incoming subcarrier signal;

means for generating said incoming optical carrier signal for transmission to the first mentioned optical communication means;

means for encoding the message encoded incoming subcarrier signal on said incoming optical carrier signal;

means for receiving from the first mentioned optical communication means said encoded outgoing optical carrier signal having encoded thereon said outgoing message encoded subcarrier signal from the first mentioned optical communication means, said incoming and outgoing subcarrier signals being different sufficiently to prevent substantially interference between incoming and outgoing communications;

means responsive to receiving said encoded outgoing optical carrier signal for decoding said outgoing subcarrier signal from said outgoing optical carrier signal transmitted by the first mentioned optical communication means;

means responsive to the decoded outgoing subcarrier signal for decoding said outgoing message signal from said outgoing subcarrier signal, whereby sending and receiving messages are accomplished utilizing two different subcarrier signals to prevent substantially interference between the incoming and outgoing signals for the same unit during a full duplex mode of operation.

17. A non-time division multiplexed wireless communication system as defined in claim 16, further including a microphone disposed physically at a remote location, and connected electrically to said means for connecting a microphone.

18. A non-time division multiplexed wireless communication system as defined in claim 16, wherein the conversion means further includes means for connecting a speaker thereto for permitting a user to physically hear the message carrying signal received by said unit.

19. A non-time division multiplexed wireless communication system as defined in claim 18, further including a speaker disposed physically at a remote location, and connected electrically to said means for connecting a speaker.

20. A non-time division multiplexed wireless communication system as defined in claim 16, further including control means for selecting at least one subcarrier signal upon which said message carrying signal is to be modulated.

21. A non-time division multiplexed wireless communication system as defined in claim 16, wherein said means for inhibiting includes means for detecting an optical message carrying beam wherein said optical message carrying beam has been radiated by the unit.

22. A non-time division multiplexed wireless communication system as defined in claim 21, wherein said means for detecting is a light receiving diode having a predetermined wavelength.

23. A non-time division multiplexed wireless communication system as defined in claim 22, wherein said means for transmitting includes a light emitting diode having a predetermined wavelength.

24. A non-time division multiplexed wireless communication system as defined in claim 23, wherein the predetermined wavelength of said light emitting diode and said light receiving diode is the same.

25. A non-time division multiplexed wireless communication system as defined in claim 24, wherein the predetermined wavelength of said light emitting diode and said light receiving diode are different.

26. A non-time division multiplexed wireless full duplex communication system according to claim 16, wherein said incoming optical carrier signal and said outgoing optical carrier signal have substantially the same carrier wavelength.

27. A non-time division multiplexed wireless full duplex communication system according to claim 16, wherein said incoming optical carrier signal and said outgoing optical carrier signal have substantially different carrier wavelengths.

28. A method for sending and receiving communication messages in a non-time division multiplexed wireless full duplex mode between similar units, comprising:

generating an outgoing subcarrier signal for helping to facilitate transmitting outgoing message signals to the other unit;

encoding outgoing message signals on said outgoing subcarrier signal;

generating an outgoing optical carrier signal for transmission to the other unit;

encoding the message encoded outgoing subcarrier signal on the outgoing optical carrier signal;

receiving an incoming optical carrier signal having encoded thereon an incoming message encoded subcarrier signal from the other unit, said incoming and outgoing subcarrier signals being different sufficiently to prevent substantially interference between incoming and outgoing communications;

responding to receiving said incoming optical carrier signal by decoding said incoming subcarrier signal from said incoming optical carrier signal transmitted by said other unit, whereby sending and receiving messages are accomplished utilizing two different subcarrier signals to prevent substantially interference between the incoming and outgoing signals for the same unit during a full duplex mode of operation.

* * * * *